Nov. 19, 1929.   P. ALGRAIN   1,736,690
ROLLING STOCK OF RAILWAYS, TRAMWAYS, OR ROAD TRANSPORT
Filed Dec. 22, 1928
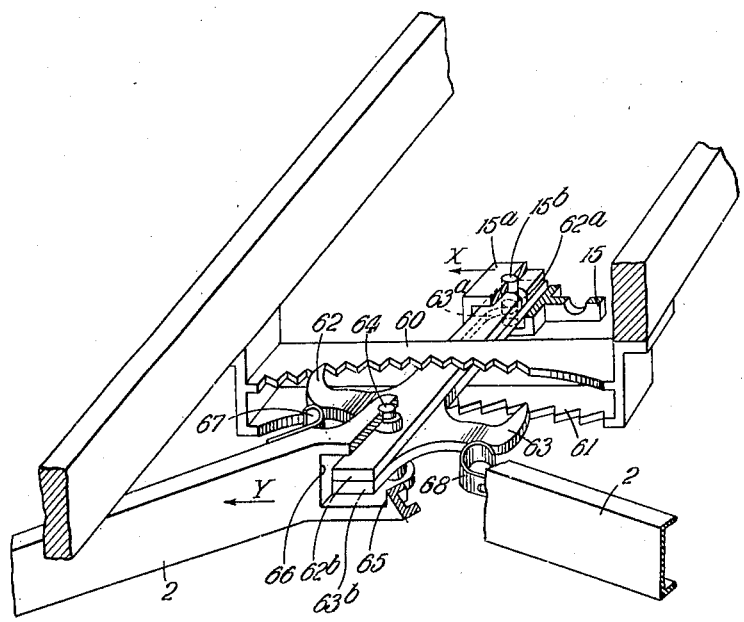
Inventor
Paul Algrain
by Wilkinson & Giusta
Attorneys.

Patented Nov. 19, 1929

1,736,690

UNITED STATES PATENT OFFICE

PAUL ALGRAIN, OF LA CROYERE, BELGIUM

ROLLING STOCK OF RAILWAYS, TRAMWAYS, OR ROAD TRANSPORT

Application filed December 22, 1928, Serial No. 328,034, and in Belgium February 23, 1928.

The invention relates to the rolling stock of railways, tramways or road transport and more particularly to means by which the vehicle is enabled to traverse a curved path with the minimum of friction and wear of the rolling stock.

In Patent No. 1,728,096, granted September 10, 1929, arrangements are described by which the axles of the vehicle take up positions radial to the curve transversed by the provision of a central Bissell truck and of two end Bissell trucks, the central truck being displaceable in a direction at right angles to the longitudinal axis of the frame of the vehicle, one end of a rod being secured to the central truck while the other end of the rod is pivoted to a lever operating a rotatable shaft.

The end trucks are pivoted at points on the longitudinal axis of the frame and the required angular movement for ensuring radiality of the axles is imparted to them by frames, substantially triangular in form, the vertices of which are respectively connected to levers secured to the rotatable shaft and parallel to the lever connected to the central Bissell truck, the members forming the said vertices being adapted to slide in guides rigid with the main frame of the vehicle and at right angles to its longitudinal axis.

In this prior construction it is found that if an abnormal shock is transmitted to one of the end trucks, so as to make it pivot on itself, the movement is transmitted to the connection joining it to the central truck. Such a shock may produce great stresses in the transmitting members which may be unduly strained.

In order to avoid this drawback, according to the present invention when each end truck is acted on by the rod by which it is connected to the lever keyed to the shaft rotated by the lateral displacement of the central truck, the connecting mechanism is displaced by a force transmitted by the said rod to the truck, but this mechanism is unaffected when the force is transmitted from the truck to the rod.

The present invention, which is a modification of or improvement in the invention described in Patent No. 1,728,096, granted September 10, 1929, obviates this drawback.

According to the invention, when the central truck is laterally displaced, torque is transmitted to the mechanism pivoting the end trucks by the rod connected to the lever secured to the rotatable shaft, but this mechanism is unaffected by a torque transmitted from an end truck to the said rod.

The accompanying drawing is a perspective view of a partial section of the arrangement according to the invention interposed between one end truck, and the rod which controls the displacements of this truck.

It comprises, for example, two toothed sectors 60 and 61, of which the teeth, suitably inclined, constitute abutments which oppose the rotation of an end truck 2 when this rotation is produced by a member other than the rod 15 controlling the connection between an end truck and the central truck. Between the rod 15 and the end truck 2 are two pawls 62 and 63 which are mounted on a pivot 64 forming part of the end truck 2. These pawls are carried by levers one end of each of which can slide in the head 15$^a$ of the rod 15. In the ends of these levers there is a hole 62$^a$ or 63$^a$, in which is placed a pin 15$^b$ forming part of the head of the rod 15$^a$. The other ends 62$^b$ and 63$^b$ of the levers carrying the pawls can abut, by pivoting about a pin 64, against abutments 65 and 66 of the truck 2. The pawls 62 and 63 are constantly urged by springs 67 or 68 into contact, respectively, with the teeth of the sectors 60 and 61.

If a torque is exerted by the rod 15 in the direction, for example, of the arrow X, through the pin 15$^b$ at the bottom of the notch 62$^a$ of the lever carrying the pawl 62, this pawl will pivot about the pin 64 and compress the spring 67. The pawl 62 will disengage itself from the teeth of the sector 60, the end 62$^b$ resting against the abutment 65, rotating the truck 2. The pawl 62 follows, owing to the notch 63$^a$, under the action of the spring 68 sliding over the teeth of the toothed sector 61.

It is easily understood that the truck 2 will be displaced in the opposite direction if the rod 15 is moved in a direction opposite to the arrow X.

If the truck 2 is caused to pivot by a force transmitted by a member other than the rod 15, this force can always have a component applied to the pivot 64 in the direction of the arrow Y or in the opposite direction.

If it is assumed that the force is exerted in the direction of arrow Y, due to the spring 67 constantly pressing the pawl 62 against the bottom of the teeth of the sector 60, owing to the shape of these teeth and to the relative position of the pivot 64, the pawl 62 tends to engage more firmly with these teeth the greater the force in the direction of arrow Y. The result is that the truck 2 cannot turn and that no reaction is transmitted to rod 15.

If the force is transmitted in the direction opposite to the arrow Y, the pawl 63 will engage more firmly with the teeth of the sector 61 and equally prevent the truck from rotating or any reaction being transmitted to the rod 15.

Having thus described the nature of the said invention and the best means I know of carrying the same into practical effect, I claim:—

1. In rolling stock, a central truck, an end truck pivoting about the central truck, a rod for controlling the connection between the end truck and the central truck, a lever moved by said rod and engaging and pivotally moving said end truck, and means for preventing movement between said end truck and the central truck connected to said lever and released thereby only when the lever is moved by said rod.

2. In rolling stock, a central truck, an end truck pivotally mounted about the central truck, a rod for controlling the connection between the end and central trucks, levers carried to move with said rods and adapted to abut against the end truck for transmitting pivotal movement thereto, and locking means carried by said levers for normally preventing movement between the end and central trucks but adapted to be released by movement of the levers arising from shifting of said rod.

3. In rolling stock, a central truck, an end truck pivotally mounted about said central truck, a rod for controlling the connection between said trucks, levers carried to move with said rod and pivoting with respect to said end truck and for abutting against the end truck to pivotally move the same, ratchets carried by said main truck, and pawls carried by said levers and normally interlocked with said ratchets but movable away from said ratchets upon shifting of said levers by said rod.

4. In rolling stock, a central truck, an end truck, pivotally mounted about said central truck, a rod controlling the connection between said trucks, levers pivoting about said end trucks and adapted to abut against the same for swinging the end trucks in either direction about the central truck, means on said rod for engaging and moving said levers, ratchets having oppositely inclined teeth carried by said central truck, pawls movable with said levers and normally interlocked with said ratchets, and spring means carried by said end truck for engaging and urging said pawls into engagement with the ratchet teeth.

5. In rolling stock, a central truck, an end truck, abutments on said end truck, a pivot for said end truck, levers fulcrumed on said pivot and having ends adapted to engage said abutment, a rod adapted to engage the other ends of said levers, and locking means between said levers and the central truck releasable only when the levers are moved by said rods.

In testimony whereof I have signed my name to this specification.

PAUL ALGRAIN.